United States Patent

Matsumoto

[11] Patent Number: 5,865,265
[45] Date of Patent: Feb. 2, 1999

[54] VEHICLE TRAVEL AIDING DEVICE

[75] Inventor: Yoshiyuki Matsumoto, Saitama, Japan

[73] Assignee: Honda Giken Kogyo Kabushiki Kaisha, Tokyo, Japan

[21] Appl. No.: 422,354

[22] Filed: Apr. 14, 1995

[30] Foreign Application Priority Data

Apr. 15, 1994 [JP] Japan ................................. 6-113306
Apr. 15, 1994 [JP] Japan ................................. 6-113307
Apr. 15, 1994 [JP] Japan ................................. 6-113308

[51] Int. Cl.$^6$ .......................................... G08G 1/00
[52] U.S. Cl. ........................................ 180/169; 340/901
[58] Field of Search ........................... 180/271, 272, 180/275, 169, 168, 167; 340/904, 902, 901, 903

[56] References Cited

U.S. PATENT DOCUMENTS 4,561,004  12/1985  Briggen et al. ......................... 364/561

FOREIGN PATENT DOCUMENTS 60-91500   5/1985  Japan .
62-81591   4/1987  Japan .
63-163210  7/1988  Japan .
4290200    4/1992  Japan .

Primary Examiner—Richard M. Camby
Attorney, Agent, or Firm—Lyon & Lyon LLP

[57] ABSTRACT

A vehicle travel aiding device for sensing running conditions of the vehicle and outputting vehicle travel supporting information, which is featured by detecting ambient circumstances and road conditions on which the vehicle is and operating driver's brake operation response on accelerator release response and changing the outputting timing or the content of the supporting information according to the detection results.

4 Claims, 6 Drawing Sheets

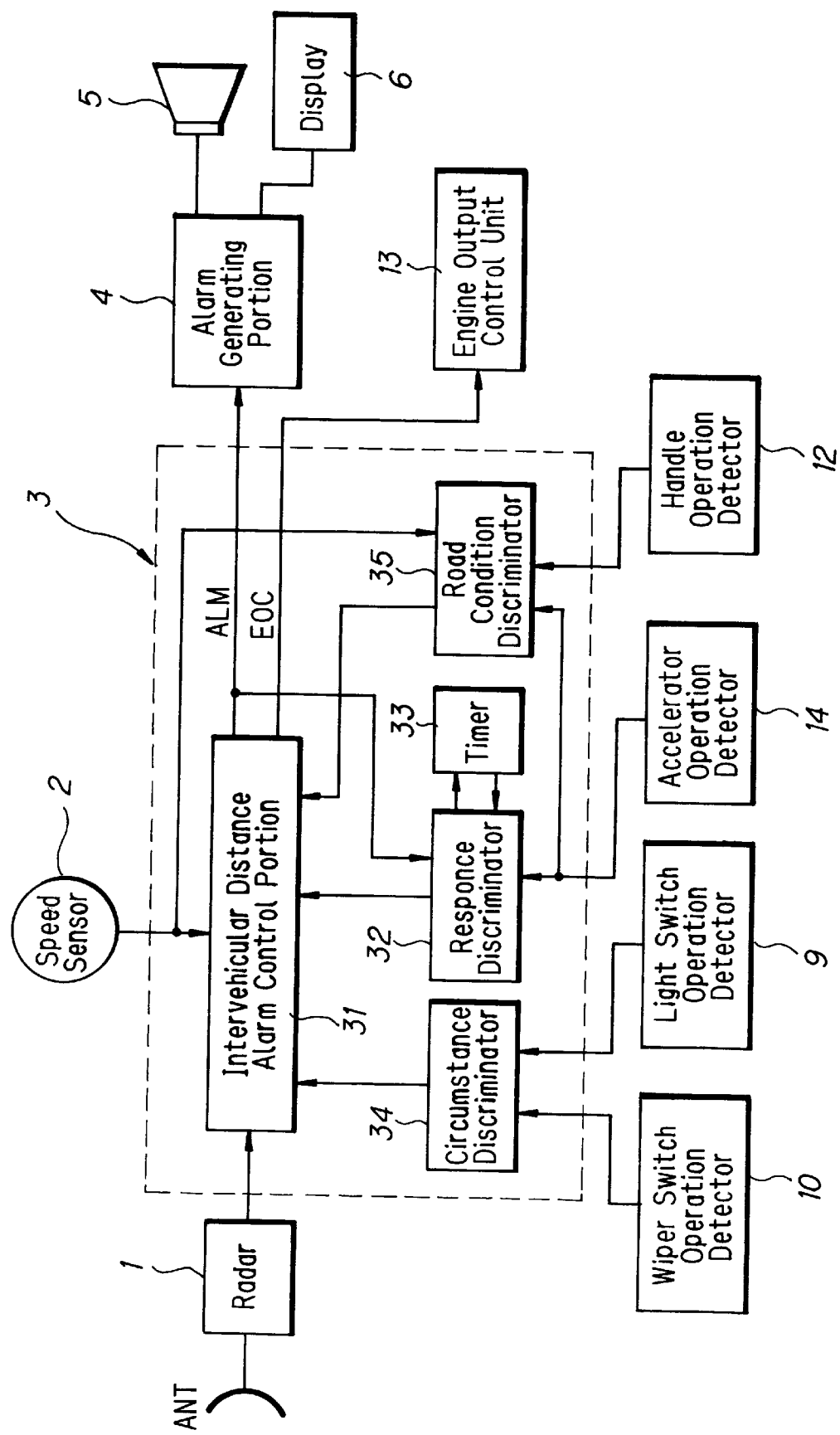

VEHICLE TRAVEL AIDING DEVICE

BACKGROUND OF THE INVENTION

The present invention relates to a vehicle travel aiding device for use in a vehicle, which device is capable of sensing running conditions of the vehicle and generating travel aiding information such as an alarm for a short distance from a preceding vehicle, running guide and so on.

Japanese laid-open patent publication No. 60-91500 discloses such a vehicle travel aiding device that continually senses the distance from another vehicle running ahead of the vehicle with the device and, when a measured distance becomes shorter than a proper intervehicular distance, produces an alarm and gives a command to make an automatic brake operate to keep the proper distance.

Japanese laid-open patent publication No. 62-81591 also discloses such a vehicle travel aiding device that can detect an obstruction ahead of the vehicle and produce an alarm when the distance from the obstruction becomes shorter than a specified value.

Japanese laid-open patent publication No. 4-290200 also discloses such a vehicle travel aiding device that can exchange data of driving conditions such as current position, running speed and running direction of other vehicles ahead of and behind the vehicle and issues an alarm when a danger of collision may arise therebetween.

Japanese laid-open patent publication No. 63-163210 discloses such a vehicle travel aiding device that determines a current location of the vehicle and indicates it along a preset travelling route on a road map indicated on a display screen and outputs a guiding instruction for turning to the right or the left at a crossing on the preset route when the vehicle is just passing a point at a specified distance from said crossing.

The problems involved in the above-mentioned prior arts devices are as follows:

A vehicle travel aiding information such as an alarm when sensing a dangerous approach of another vehicle or a guiding instruction when approaching to a specified crossing is issued at a constant specified timing, neglecting the possible influence of circumstances. Such information, therefore, may not effectively help one to drive the vehicle, for example, in rain or at night.

When a driver drives his vehicle on a super highway or a mountain road, he must be provided with correct and suitable information in consideration of the actual road conditions, which can not be provided by the prior art devices designed for only periodical generation of simple guiding data.

There is still such a problem that every driver may have his own response to an alarm on a short intervehicular distance and, therefore, the alarm issued at a fixed timing determined by a specified calculation may be too early or too late for one to operate the vehicle's accelerator or brake in correct time.

SUMMARY OF THE INVENTION

Accordingly, an object of the present invention is to provide a vehicle travel aiding device for giving information to help a driver to drive the vehicle according to detected conditions of the road on which the vehicle is running, which is capable of giving aiding information at a correct timing that may adapt to surrounding brightness influencing the visibility of the driver of the vehicle and which is realized by using means for sensing a light switch operation mode and means for changing the timing of giving an aiding information according to a detected operation mode of the light switch.

Another object of the present invention is to provide a vehicle travel aiding device which is capable of changing the content of the aiding information according to the detected operation mode of a light switch.

Another object of the present invention is to provide a vehicle travel aiding device for giving information to support a driver to drive the vehicle according to detected conditions of the road on which the vehicle is running, which is capable of giving aiding information at the optimal timing that may vary depending upon weather influencing the visibility and other running conditions of the vehicle by using sensing means for sensing the operation mode of a wiper and control means for changing the timing of giving the aiding information according to the detected operation mode of the wiper drive.

Another object of the present invention is to provide a vehicle travel aiding device which is capable of changing the content of the aiding information according to the detected operation mode of a wiper drive.

Another object of the present invention is to provide a vehicle travel aiding device for giving information to help a driver to drive the vehicle according to detected conditions of the road on which the vehicle is running, which is capable of giving aiding information at the optimal timing that may be attained by judging the driver's ability on the basis of a measured response time of his operation to be aided by the device and by judging surrounding and running conditions of the vehicle.

BRIEF DESCRIPTION OF THE DRAWINGS

FIG. 8 is a construction block diagram of another vehicle travel aiding device embodying the present invention.

DESCRIPTION OF THE PREFERRED EMBODIMENTS

The preferred embodiments of the present invention will now be described in detail by way of example and with reference to the accompanying drawings.

Figure 1:
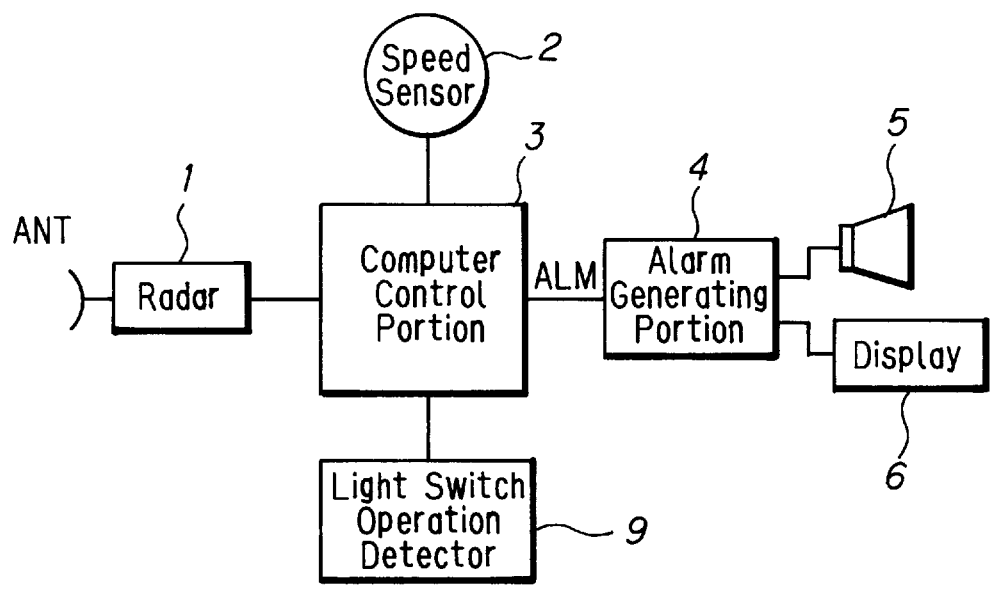
FIG. 1 is a construction block diagram of a vehicle travel aiding device embodying the present invention.

FIG. 1 shows an embodiment of a vehicle travel aiding device which gives an alarm by sensing a degree of approach of the vehicle to a preceding vehicle.

The vehicle travel aiding device comprises a radar 1 (e.g., a FM-CW type radar) for measuring the distance from a preceding vehicle and the relative running speed of the two vehicles; a speed sensor 2 for detecting a running speed of the vehicle in which the device is mounted; a computer control portion 3 that determines a proper distance from the preceding vehicle by calculation from the relative running speed detected by the radar 1 and the running speed detected by the speed sensor 2, compares the current intervehicular distance with the determined proper (reference) distance and generates an alarm instruction signal ALM if the current distance is shorter than the calculated proper distance; and an alarm generating portion 4 that according to the alarm instruction signal ALM generates an alarm of the short intervehicular distance by using a speaker 5 and a display 6. In FIG. 1, ANT designates a radar antenna.

The radar 1 senses a distance from the precedent vehicle and the relative running speed between the vehicle according to a known conventional method and the computer control portion 3 determines a proper intervehicular distance according to a known conventional method.

In the thus constructed device, an improvement according to the present invention is made to provide a light-switch operation detector 9 that detects which one of operation modes OFF, SMALL, LOW BEAM or, HIGH BEAM is selected by a light-operation mode selecting switch to determine a status of brightness which may have an influence on the forward visibility of the driver of the vehicle and to provide control means that change the timing of outputting an alarm instruction signal ALM.

When the light switch operation portion 9 detects the light switch set at OFF, the computer control portion 3 judges that the vehicle is running in the daytime, and gives the alarm instruction ALM at an ordinary timing when the detected distance from the preceding vehicle is shorter than the proper intervehicular distance determined according to a specified calculating procedure.

With the light switch detected at the SMALL position, the computer control portion 3 judges that the ambient light is dim and gives the alarm instruction ALM at a timing advanced by one step, while with the light switch detected at the LOW BEAM position, the computer control portion 9 judges it is night or dark in a tunnel and gives the alarm instruction ALM at a timing advanced by two steps. With the light switch detected at the HIGH BEAM position, the computer control portion 3 judges it is pitch-dark and gives the alarm instruction ALM at a timing advanced by three steps.

In practice, correction factors k1 for correcting a proper intervehicular distance at respective status levels 0 (OFF), 1 (SMALL), 2 (LOW BEAM) and 3 (HIGH BEAM) of the light switch are prepared as shown below in Table 1 and used for correction of the proper intervehicular distance determined by the same calculation procedure in such a way that one of the correction factors is selected according to the present operation mode of the light switch and the proper intervehicular distance L is multiplied by the selected correction factor to get a corrected proper distance value L' as shown below in an expression (1).

TABLE 1

| STATUS | Correction Factors k1 |
|---|---|
| 0 | 1.0 |
| 1 | 1.1 |
| 2 | 1.2 |
| 3 | 1.3 |

$$L' = L * k1 \qquad (1)$$

where L' is a corrected proper intervehicular distance.

The correction factors are selected in such a way that a proper intervehicular distance that is determined on the condition that the light switch is set at OFF position may be increased by 1.1 times with the light switch set at SMALL, 1.2 times with the light switch at LOW BEAM and 1.3 times with the light switch at HIGH BEAM.

Figure 2:
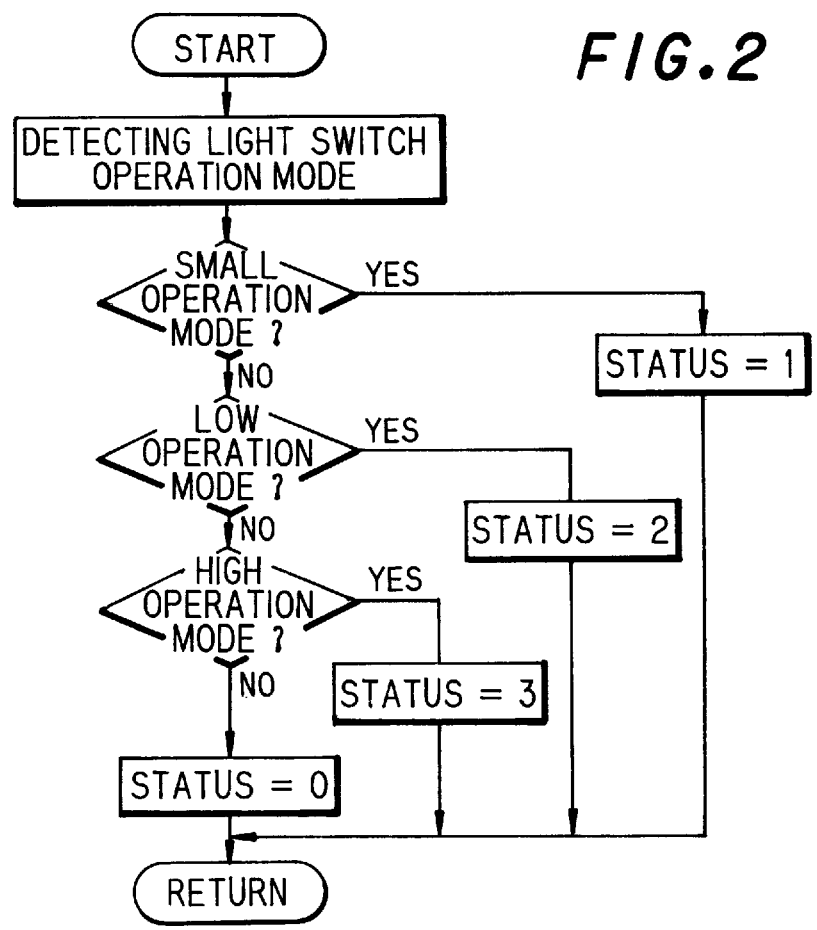
FIG. 2 a flow chart showing a procedure for determining the status depending upon an operation mode of a light switch.

FIG. 2 shows a flow chart for determining the status according to an operation mode of the light switch.

When the light switch is set at SMALL or LOW BEAM or HIGH BEAM position, the proper intervehicular distance is corrected to be correspondingly increased and, therefore, the timing of giving the alarm instruction ALM when the actual distance is shorter than the corrected proper distance may be correspondingly (step by step) advanced.

Figure 3:
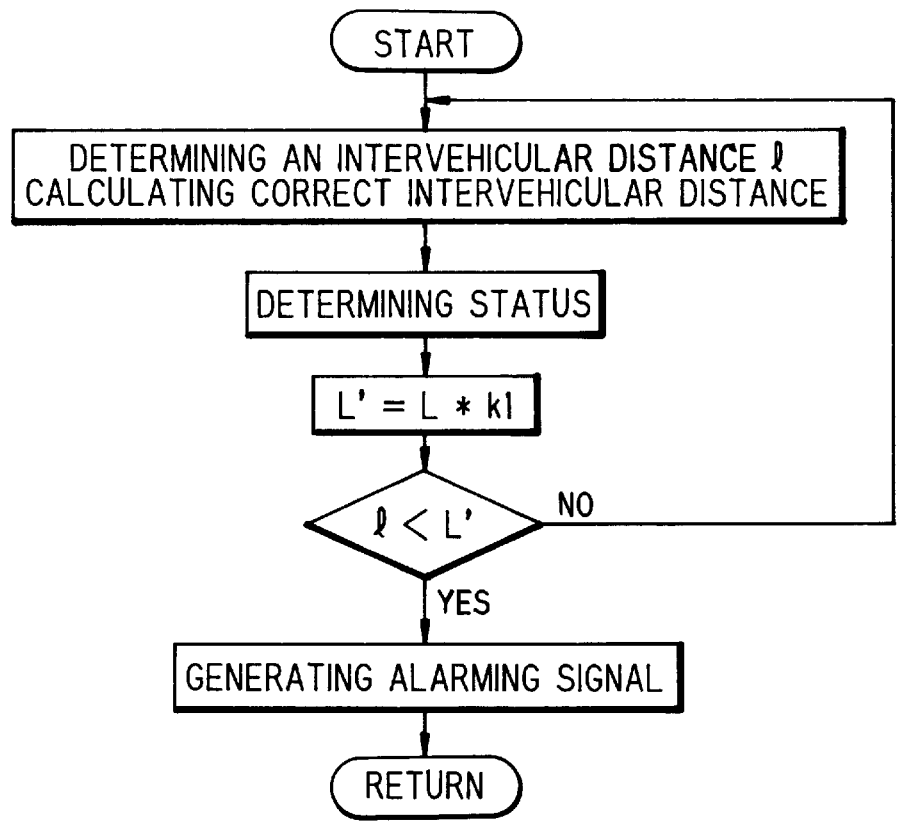
FIG. 3 is a flow chart showing a procedure for producing an alarm by comparing a measured intervehicular distance with a corrected reference value depending upon an operation mode of a light switch.

FIG. 3 is a flow chart for generating an alarm by comparing the corrected proper intervehicular distance L' with a measured intervehicular distance l.

In a vehicle travel aiding device (not shown) which can detect a distance from any obstruction (besides a preceding vehicle) ahead on the road by using an obstruction detecting radar and give an alarm when the detected distance from the obstruction is smaller than a specified threshold value, the present invention may be applied to enable the vehicle to sense a current operation mode SMALL or LOW BEAM or HIGH BEAM of the light switch and correct the threshold value to be correspondingly increased for the detected mode to stepwise change the timing of generating the alarm.

In a vehicle travel aiding device which can search and indicate a current location of the vehicle on a road map indicated on a display screen and give an instruction for turning to the right or the left when the vehicle is passing a point at a specified distance from a crossing existing ahead on a travelling course preset on the road map, the present invention may be applied to enable the vehicle to sense the current operation mode SMALL or LOW BEAM or HIGH BEAM of the light switch and correct the distance to the crossing to be correspondingly increased for the detected mode, thereby advancing the timing of giving said guiding instruction.

Besides changing the timing of issuing the vehicle travel aiding information, e.g., as the alarm for a short intervehicular distance or an obstruction and the travel guiding information according to an operation mode selected by the light switch, the present invention can also enable every such device to judge that there is no vehicle running ahead on the road when the light switch is set at HIGH BEAM (this judgment is made by the computer operation portion 3 of the shown embodiment) and switch off the radar for a while for saving its battery consumption and, furthermore, to change the content of aiding information when there is no up-coming vehicle travel guiding information under the same operation mode of the light switch.

Figure 4:
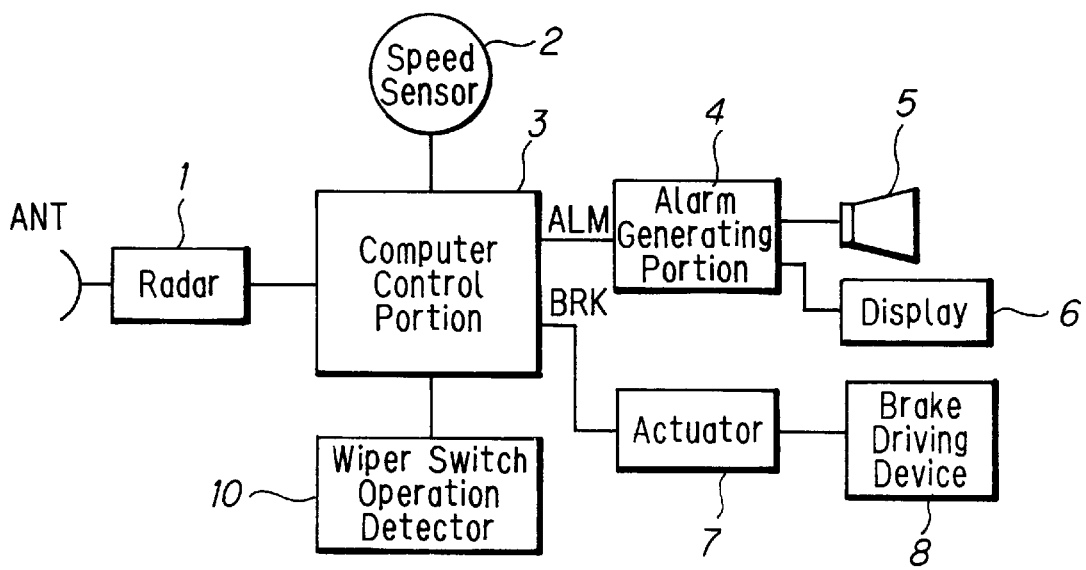
FIG. 4 is a construction block diagram of another vehicle travel aiding device embodying the present invention.

FIG. 4 shows an embodiment of a vehicle travel aiding device which is capable of outputting an alarm when approaching a preceding vehicle and giving an instruction for driving or operating an automatic brake.

The vehicle travel aiding device comprises a radar 1 (e.g., a FM-CW type radar) for measuring the distance from a preceding vehicle and the relative running speed; a speed sensor 2 for detecting the running speed of the vehicle in which the device is mounted; a computer control portion 3 that determines the proper distance from the preceding vehicle by a calculation based on the relative running speed detected by the radar 1 and the running speed detected by the speed sensor 2, compares the current intervehicular distance with the determined proper distance and generates an alarm instruction ALM and an automatic brake driving instruction BRK to keep the necessary intervehicular distance if the current distance is shorter than the calculated proper distance; an alarm generating portion 4 that, according to the alarm instruction signal ALM, generates an alarm indicating the short intervehicular distance by driving a speaker 5 and a display 6; and an actuator 7 for driving a brake driving device 8 according to the automatic brake driving instruction BRK. In FIG. 4, ANT designates a radar antenna.

In the thus constructed device, an improvement according to the present invention is made to provide a wiper-switch operation detector 10 for detecting which one of the operation modes PERIODICAL, SLOW and FAST is selected by a wiper-operation mode switch and determining the status of the weather which may have an influence on the forward visibility of the driver and running condition of the vehicle (for example, when the braking distance is to be control), and computer control means 3 for changing the timing of outputting an alarm instruction ALM and an automatic brake driving instruction BRK according to the detected operation mode of the wiper switch.

When the wiper switch operates periodically, the device judges it is drizzling and advances by one step the timing of giving the alarm information ALM and the automatic brake driving instruction BRK. When the wiper is moving slowly, the device judges it is lightly raining and, therefore, advances by two steps the timing of giving the alarm instruction ALM and the braking instruction BRK. When the wiper is moving fast, the device judges it is raining heavily and, therefore, advance by three steps the timing of giving the alarm instruction ALM and the braking instruction BRK.

In practice, correction factors k2 for a proper intervehicular distance at respective statuses 0 (OFF), 1 (PERIODICAL), 2 (SLOW) and 3 (FAST) of the wiper switch are prepared as shown below in Table 2 and used for correction of the proper intervehicular distance determined by the same calculation procedure described above in such a way that one of the correction factors is selected according to the present operation mode of the wiper switch and the proper intervehicular distance value L is multiplied by the selected correction factor k2 to get a corrected reference distance value L" as shown below in an expression (2).

TABLE 2

| STATUS | Correction Factors k2 |
|---|---|
| 0 | 1.0 |
| 1 | 1.1 |
| 2 | 1.2 |
| 3 | 1.3 |

$$L" = * k2 \quad (2)$$

where L" is a corrected proper intervehicular distance.

The correction factors are selected in such a way that the proper intervehicular distance determined when wiper does not move may be increased by 1.1 times when the wiper is operating PERIODICALLY, 1.2 times when the wiper is operating SLOWLY and 1.3 times when the wiper is operating FAST.

Figure 5:
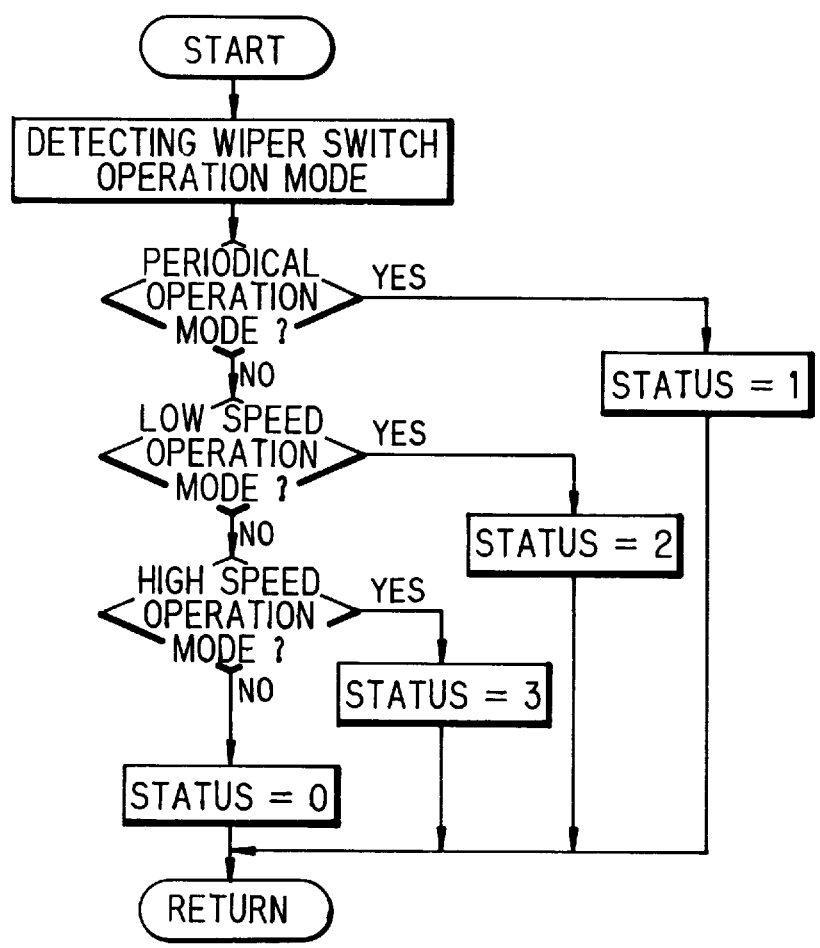
FIG. 5 is a flow chart of procedure for determining the status of the vehicle depending upon an operation mode of a wiper switch.

FIG. 5 shows a flow chart for determining a status according to an operation mode of the wiper switch.

When the wiper operates periodically (status 1) or slowly (2) or fast (3), the proper intervehicular distance is corrected to be correspondingly increased and, therefore, a timing of giving the alarm instruction ALM and the automatic brake driving instruction BRK when an actual distance is shorter than the corrected proper distance may be correspondingly (step by step) advanced.

Figure 6:
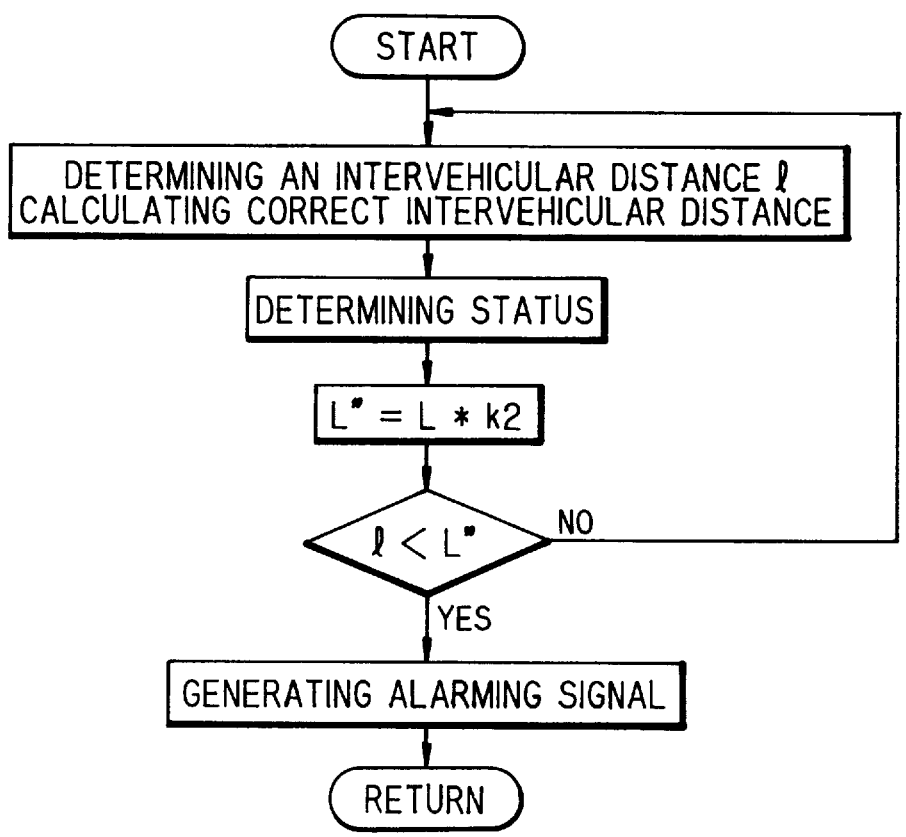
FIG. 6 is a flow chart showing a procedure for producing an alarm by comparing the measured intervehicular distance with a corrected reference value depending upon an operation mode of a wiper switch.

FIG. 6 is a flow chart for generating an alarm by comparing the actually measured intervehicular distance 2 with the corrected proper intervehicular distance L".

In a vehicle travel aiding device (not shown) which can detect a distance from any obstruction (besides a preceding vehicle) ahead on the road by using an obstruction detecting radar and give an alarm when the detected distance from the obstruction is smaller than a specified threshold value, the present invention may be applied to enable the vehicle to sense a current operation mode PERIODICAL or SLOW or FAST of the wiper switch and to correct the threshold value to be correspondingly increased for the detected mode, thereby stepwise changing the timing of generating an alarm.

In a vehicle travel aiding device which can search and indicate a current location of the vehicle on a road map indicated on a display screen and give an instruction for turning to the right or the left when the vehicle is passing a point at a specified distance from a crossing existing ahead on a travelling course preset on the road map, the present invention may be applied to enable the vehicle to sense a current operation mode PERIODICAL or SLOW or FAST of the wiper switch and to correct the distance to the crossing to be correspondingly increased for the detected mode, thereby advancing the timing of giving the guiding instruction.

Besides changing the timing of issuing the vehicle travel aiding information such as the alarm for a short intervehicular distance or an obstruction and the travel guiding information according to an operation mode selected by the wiper switch, the present invention can also enable every such vehicle to stepwise lower the response of the accelerator and the response of the steering handle for the driver's operation amount exceeding the specified value by using respective adjusting means for preventing slippage of the vehicle in a rainy day at an emergency braking or steering.

It is also possible to stepwise increase loudness of the audio alarm for the short intervehicular distance or of the guiding speaker according to respective operation modes of the wiper switch to assure the necessary loudness during a rainy day, especially in heavy rain.

Figure 7:
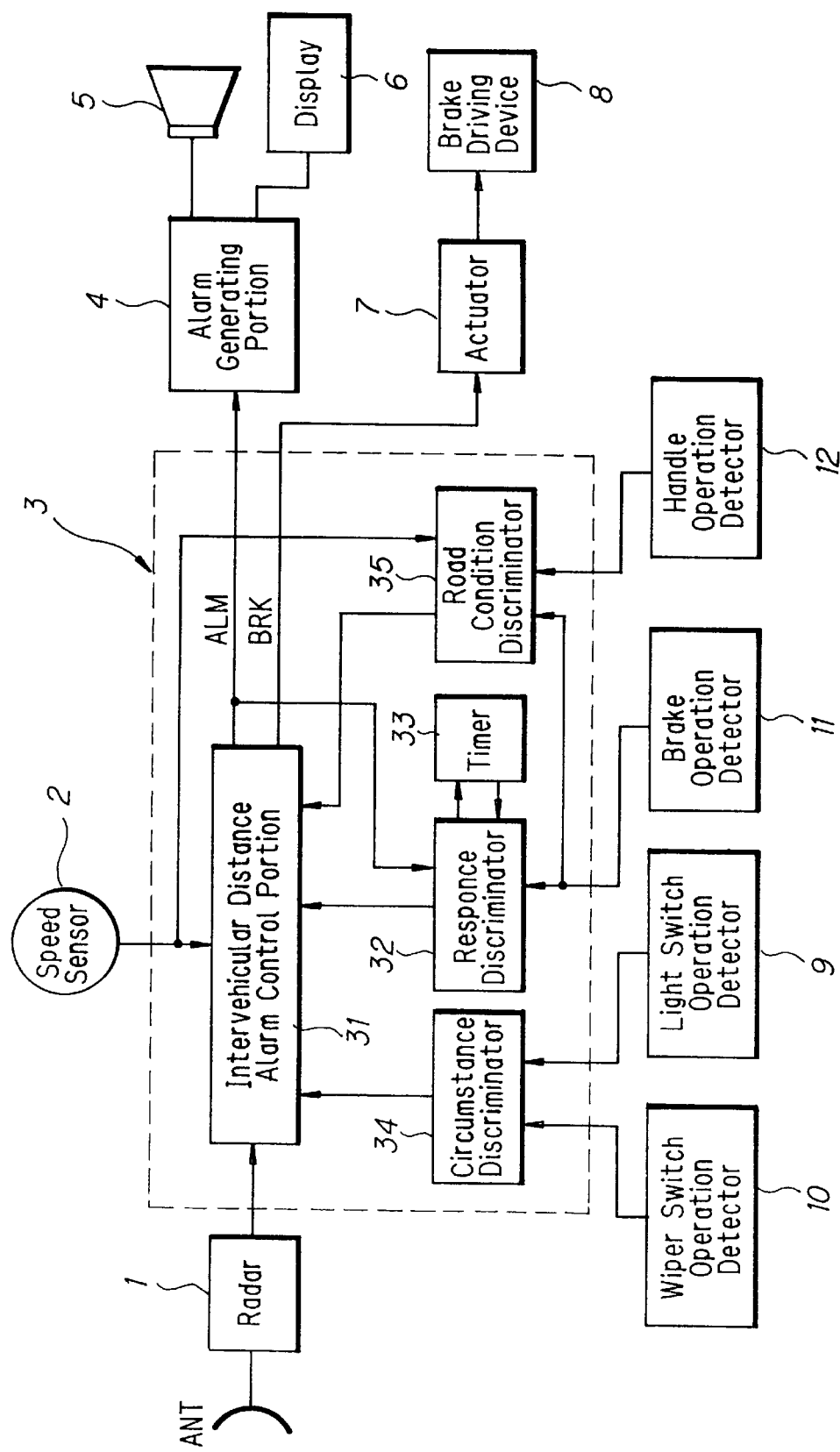
FIG. 7 is a construction block diagram of another vehicle travel aiding device embodying the present invention.

FIG. 7 shows an embodiment of a vehicle travel aiding device which is capable of outputting an alarm upon approaching a preceding vehicle and giving an instruction for operating an automatic brake.

The vehicle travel aiding device comprises a radar 1 (e.g., a FM-CW type radar) for measuring a a distance from a preceding vehicle and the relative running speed; a speed sensor 2 for detecting the running speed of the vehicle in which the device is mounted; a computer control portion 3 (including intervehicular distance alarm control portion 31) that determines a proper distance from the preceding vehicle by a calculation based on the relative running speed detected by the radar 1 and the running speed detected by the speed sensor 2, compares the current intervehicular distance with the determined proper distance and generates an alarm instruction ALM when the detected current distance becomes shorter than the calculated proper distance; an alarm generating portion 4 that, according to the alarm instruction signal ALM, generates an alarm for the short intervehicular distance by driving a speaker 5 and a display 6 and an actuator 7 of a brake driving device 8 according to the automatic brake driving instruction BRK. In FIG. 7, ANT designates a radar antenna.

In the device thus constructed, an improvement according to the present invention is made by providing the computer control portion 3 with sensing means for sensing braking operation for which the intervehicular distance alarm is made, means for judging the response of the driver by measuring the duration from the time of issuing the alarm to the time of detecting the braking operation, means for detecting circumstances of the vehicle, means for sensing road conditions and means for changing the timing of outputting the alarm instruction ALM and the automatic brake driving instruction BRK according to the detected response of the driver, circumstances and road conditions.

In practice, as shown in FIG. 7, a brake operation detector 11 detects that a brake pedal of the vehicle has just been stepped on and a response discriminator 32 of the computer control portion 3 measures the time from the moment of issuing the alarm to the moment of detecting the braking operation by using a timer 33. The response discriminator 32 discriminates the responding state of the driver by averaging the measured values and generates an instruction for changing the alarm outputting timing according to the determined responding state of the driver and transfers it to an intervehicular distance alarm control portion 31 that in turn outputs the alarm instruction ALM and automatic brake driving instruction BRK at a suitable timing.

When a response time of, e.g., 1.2 seconds is taken as a standard, the response discriminator 32 judges a driver response is fast or slow if a measured response time is not more than 1.0 second or not less than 1.4 seconds, respectively, and gives a timing change instruction to the intervehicular distance alarm control portion 31 so that portion may output the alarm instruction ALM and the automatic brake driving instruction BRK at a timing delayed or advanced by a specified value.

The intervehicular distance alarm control portion 31 has prepared correction factors that may decrease or increase the basically calculated proper intervehicular distance by 20 percent for a fast and slow, respectively, response of the driver. The intervehicular distance alarm control portion 31 corrects the basically calculated proper intervehicular distance by multiplying by a correction factor selected according to the instruction received from the response discriminator 32.

As shown in FIG. 7, a wiper switch operation detector 10 detects a "periodical" or "slow" or "fast" operation mode selected by the wiper switch and a circumstance discriminator 34 of the computer control portion 3 judges the extent the weather is having an influence on the visibility and running conditions of the vehicle according to the detected wiper-operation-mode and gives the intervehicular distance alarm control portion 31 an instruction for changing the output timing.

When the wiper switch operates periodically, the circumstance discriminator 34 judges it is drizzling and gives an output-timing change instruction to the intervehicular distance alarm control portion 31 to advance by one step the timing of giving the alarm information ALM and the automatic brake driving instruction BRK. When the wiper is working slowly, the device judges it is raining lightly and gives an output-timing change instruction to advance by two steps the timing of giving the alarm information ALM and the automatic brake driving instruction BRK. When the wiper is moving fast, the device judges it is raining heavily and generates an output-timing change instruction to advance by three steps the timing of giving the alarm instruction ALM and the automatic brake driving instruction BRK.

The intervehicular distance alarm control portion 31 has preset correction factors usable for increasing the calculated proper intervehicular distance by 10 percent at the periodical operation mode of the wiper, 30 percent at the slow operation mode and 50 percent at the fast operation mode. This alarm control portion 31 corrects the calculated intervehicular distance by multiplying by a correction factor selected according to an instruction received from the circumstance discriminator 34.

This feature makes it possible to stepwise discriminate weather by detecting a selected operation mode of the wiper without using a rainfall sensor.

As shown in FIG. 7, a light switch operation detector 9 detects a "small" or "low beam" or "high beam" operation mode selected by the light switch and the circumstance discriminator 34 of the computer control portion 3 judges the ambient brightness having an influence on a visibility and running conditions of the vehicle according to the detected operation mode of the light switch and gives the intervehicular distance alarm control portion 31 an instruction for changing the output timing.

With the light switch detected at the SMALL position, the circumstance discriminator 34 of the computer control portion 3 judges the ambient light is dim and instructs the intervehicular distance alarm control portion 31 to advance its alarm output timing by one step, while with the light switch detected at the LOW BEAM position, the circumstance discriminator 34 judges it is night or dark in a tunnel and instructs the intervehicular distance alarm control portion 31 to advance its alarm output timing by two steps. With the light switch detected at the HIGH BEAM position, the circumstance discriminator 34 judges it is pitch-dark and instructs the intervehicular distance alarm control portion 31 to advance its alarm output timing by three steps.

The intervehicular distance alarm control potion 31 has preset correction factors usable for increasing the calculated proper intervehicular distance by 10 percent at the SMALL operation mode of the wiper, 30 percent at the LOW BEAM operation mode and 50 percent at the HIGH BEAM operation mode. This alarm control portion 31 corrects the calculated intervehicular distance by multiplying by a correction factor selected according to an instruction received from the circumstance discriminator 34.

This feature makes it possible to stepwise discriminate the ambient brightness by detecting the selected operation mode of the light switch without using a brightness sensor.

As shown in FIG. 7, a handle operation detector 12 detects a steering angle of the steering wheel or handle exceeding a specified value by using a steering angle sensor or direction sensor and generates a steering handle operation detection signal which is transferred together with detection signals from the speed sensor 2 and the brake operation detector 11 to a road condition discriminator 35 of the computer control portion 3 that in turn judges what kind of a road, e.g., a mountain road or a superhighway on which the vehicle is running on the basis of the received detection signals and instructs the intervehicular distance alarm control portion 31 to change its output timing.

In practice, the road condition discriminator 35 determines a steering handle operation frequency for a specified travel distance from handle operation detection signals and examines whether the determined value exceeds a given threshold, determines a brake operation frequency for a specified travel distance from brake operation detection signals and examines whether the determined value exceeds a given threshold or not and, then, determines an average running speed of the vehicle from speed detection signals and examines whether the determined value exceeds a given threshold.

When both the handle operation frequency and the brake operation frequency exceed the respective thresholds, the road condition discriminator 35 judges the road to be a mountain road and instructs the intervehicular distance alarm control portion 31 to output an alarm instruction ALM and an automatic brake driving instruction BRK at a timing advanced by a specified corresponding step value.

When the brake operation frequency is low and the average speed exceeds the given threshold, the road condition discriminator 35 judges the road to be a superhighway and instructs the intervehicular distance alarm control portion 31 to output an alarm instruction ALM and an automatic brake instruction BRK at a timing advanced by a specified corresponding step value.

The intervehicular distance alarm control portion 31 has a preset correction factor usable for increasing the calculated proper intervehicular distance by 20 percent in the case of the road being a mountain road or a superhighway and corrects the calculated intervehicular distance by multiplying by a correction factor selected according to the instruction received from the road condition discriminator 35.

As a basically calculated proper intervehicular distance is thus corrected according to the respective discrimination results as to the driver's response, the ambient circumstances and the road conditions, the timing of giving the alarm instruction ALM and the automatic brake driving instruction BRK, which is determined based on the result of comparison of an actually detected intervehicular distance with a corrected proper distance, can be correspondingly changed.

Table 3 shows correction factors to be used for correcting a basically calculated proper intervehicular distance according to the driver's response, the ambient circumstances and the road conditions.

TABLE 3

| Response | Fast | Slow | |
|---|---|---|---|
| | 0.8 | 1.2 | |
| | (decreased by 20%) | (increased by 20%) | |
| Weather | Drizzling | Light Rain | Heavy Rain |
| | 1.1 | 1.3 | 1.5 |
| | (increased by 10%) | (increased by 30%) | (increased by 50%) |
| Brightness | Dim | Dark | Pitch-dark |
| | 1.1 | 1.2 | 1.5 |
| | (increased 10%) | (increased by 20%) | (increased by 50%) |
| Road Conditions | Mountain road | Highway | |
| | 1.2 | 1.2 | |
| | (increased by 20%) | (increased by 20%) | |

The intervehicular distance alarm control portion 31 systematically examines output-timing change instructions separately received from the response discriminator 32, the circumstance discriminator 34 and the road condition discriminator 35, performs calculations according to a given procedure and finally decides a timing of issuing an alarm instruction ALM and automatic brake driving instruction BRK in the following manner:

For example, when a vehicle is driven by a driver having a fast response (corresponding to a correction factor of −20%) in a heavy rain (a factor +50%) at night (a factor +20%), a basically calculated proper intervehicular distance is increased by 50%(−20+50+20), whereby the timing of outputting the alarm instruction ALM and the automatic brake driving instruction BRK is advanced by 50% in comparison with the ordinary timing. When the vehicle is driven by a driver having a fast response (−20%) on a mount road (+20%) during a fine day, the proper intervehicular distance is not changed (−20%+20%=0%), whereby the alarm instruction ALM and the automatic brake operation instruction BRK are outputted at the ordinary timing. Other cases are processed in a similar way as the above-mentioned examples.

FIG. 8 shows another embodiment of the present invention, which further includes an accelerator operation detector 14 and, similar to the aforedescribed embodiment, a response discriminator 32 judges the response ability of the driver by measuring the time interval between the moment of issuing the alarm instruction ALM to the moment of releasing the accelerator, determines an accelerator operation frequency for a specified running distance from detection signals from the accelerator operation detector 14 and examines whether the determined frequency exceeds a given threshold value or not.

In this embodiment, the intervehicular distance alarm control portion 31 gives an engine output control instruction EOC to an engine output control unit 13 to forcibly reduce the rate of rotation of the vehicle's engine (instead of automatic braking instruction) at the time of issuing the intervehicular distance alarm.

In a vehicle travel aiding device (not shown) which can detect a distance from any obstruction (besides a preceding vehicle) ahead of the vehicle on the road by using an obstruction detecting radar and give an alarm when the detected distance from the obstruction is smaller than a specified threshold value, the present invention may be applied to enable the device to systematically examine the results of discrimination of the driver's response, the ambient circumstances and the road conditions and correct the threshold value to optimally change the timing of generating an alarm.

In a vehicle travel aiding device which can search and indicate a current location of the vehicle on a road map indicated on a display screen and give an instruction for turning to the right or the left when the vehicle is passing a point at a specified distance from a crossing existing ahead on a travelling course preset on the road map, the present invention may be applied and enable the device to systematically examine the results of discrimination of the driver's response ability, the ambient circumstances and the road conditions and correct the threshold value to optimally change the alarm generating timing.

As described above, the present invention provides a vehicle travel aiding device for generating vehicle travel aiding information such as an alarm for a short distance from another vehicle to assure safe travelling, a guiding instruction at a crossing and so on, which can stepwise sense a degree of surrounding brightness (darkness) influencing the visibility ahead of the vehicle by detecting an operation mode selected by a light switch (without using any brightness sensor and A-D converter) and output supporting information at an optimal timing or with an optimal content according to the detection result.

The present invention provides vehicle travel aiding device for generating a vehicle travel supporting information such as an alarm for a short distance from another vehicle to assure safe travelling, a guiding instruction at a crossing and so on, which can stepwise sense weather conditions influencing the visibility ahead of the vehicle by detecting a wiper operation mode (without using any rainfall sensor and A-D converter) and output supporting information at an optimal timing or with an optimal content according to the detection result.

The present invention provides a vehicle travel aiding device for detecting running conditions of the vehicle and generating vehicle travel aiding information such as an intervehicular distance alarm and other travel guiding information according to the detected conditions, which can judge a driver's responding ability by measuring a response time for his operation, discriminate a degree of separately detected ambient circumstances and road conditions and change the timing of outputting all such supporting information based on a synthetic judgment of the discrimination results, thereby issuing the supporting information at an optimal timing with due consideration of the driver's ability, circumstances and road conditions.

What is claimed is:

1. A driver assistance device for a vehicle, said device comprising:

means for determining an operation mode of said device based upon a high or low beam characteristic of a headlight switch, and control means for changing a temporal characteristic of travel support information provided by said device based upon said determined characteristic of said light switch, wherein said travel support information comprises at least one of either an alarm or an instruction to operate an automatic brake when a predetermined forward distance from another vehicle is detected by said device.

2. A driver assistance device for a vehicle, said device comprising:

means for determining an operation mode of said device based upon a high or low beam characteristic of a headlight switch, and control means for changing a temporal characteristic of travel support information provided by said device based upon said determined characteristic of said light switch, wherein said travel support information comprises at least one of either an alarm or an instruction to operate an automatic brake when an obstruction in a roadway is detected in front of the vehicle by said device.

3. A driver assistance device for a vehicle, said device comprising:

means for determining an operation mode of said device based upon a high or low beam characteristic of a headlight switch, and control means for changing a temporal characteristic of travel support information generated by said device based upon said determined characteristic of said headlight switch, wherein said travel support information comprises vehicle navigation information for forward travel of the vehicle.

4. A driver assistance device for a vehicle, said device comprising:

means for determining an operation mode of said device based upon a characteristic of a light switch, and control means for judging whether navigation assistance is needed or not according to said determined operation mode, wherein said navigation assistance comprises an alarm signal generated when a predetermined distance from another vehicle is detected by said device, and wherein said characteristic of said light switch comprises a "low beam" operation mode and a "high beam" operation mode.

* * * * *

UNITED STATES PATENT AND TRADEMARK OFFICE
CERTIFICATE OF CORRECTION

PATENT NO.   : 5,865,265
DATED        : February 2, 1999
INVENTOR(S)  : Matsumoto It is certified that error appears in the above-identified patent and that said Letters Patent is hereby corrected as shown below:

In the Abstract, line 4, after "vehicle is" delete "and"
In the Abstract, line 5, after "operating" insert -- the --, and after "response" delete "on" and insert -- or --.

Signed and Sealed this

Twenty-eighth Day of December, 1999

Attest:

Attesting Officer

Q. TODD DICKINSON

Acting Commissioner of Patents and Trademarks